United States Patent Office 3,261,839
Patented July 19, 1966

3,261,839
ETHYNYLATED QUINOLIZINES
Richard E. Brown, Hanover, and Robert I. Meltzer, Rockaway, N.J., assignors to Warner-Lambert Pharmaceutical Company, Morris Plains, N.J., a corporation of Delaware
No Drawing. Filed Nov. 15, 1963, Ser. No. 323,896
4 Claims. (Cl. 260—289)

This application is a continuation-in-part application of our copending application Serial No. 304,976, filed August 27, 1963, now U.S. Patent No. 3,219,668, and our copending application Serial No. 248,872, filed January 2, 1963.

This invention relates to substituted quinolizines. More particularly, this invention relates to certain ethynylated quinolizines having the formula:

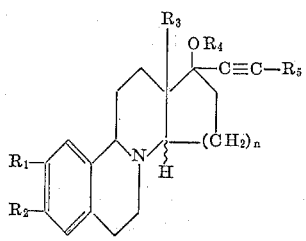

wherein $R_1$ and $R_2$ may be hydrogen, hydroxy or lower alkoxy such as methoxy, ethoxy, propoxy, and the like; $R_3$ may be hydrogen or lower alkyl such as methyl, ethyl, propyl, butyl, isobutyl and the like; $R_4$ may be hydrogen or an acyl radical such as acetyl, propionyl, benzoyl and the like; and $R_5$ may be hydrogen, halogen such as chlorine or bromine, lower alkoxy such as methoxy or ethoxy, or lower alkyl such as methyl, ethyl, propyl and the like, or an aryl radical such as phenyl, benzyl and the like; and $n$ is an integer of 1 or 2. This invention also includes within its scope a novel process for the production of these quinolizines as well as intermediates useful for their production. The use of a wiggly line in the above formula denotes that the orientation of hydrogen atom can be either cis- or trans-orientated with respect to $R_3$. On the other hand, the use of a dotted line denotes trans-orientation and the use of a solid line denotes cis-orientation.

The numbering of the compounds of this invention when $n$ is 2 is as follows:

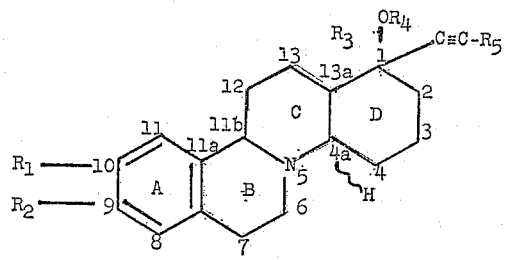

and when $n$ is 1 the numbering is as follows:

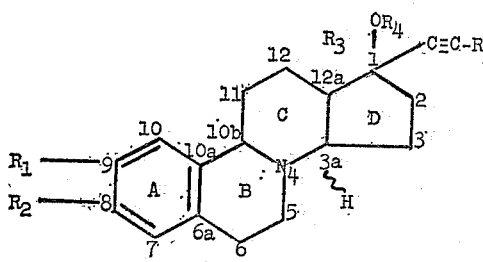

The novel compounds of this invention are related to the cyclopentanophenanthrenes and are important therapeutic agents useful in the treatment of circulatory collapse and endocrine disorders.

In addition the novel compounds of this invention are valuable intermediates for the production of other substituted quinolizines such as those of the formula:

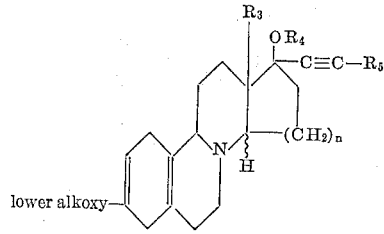

which can be readily obtained by reducing the novel 1-ethynylated quinolizines of this invention wherein $R_1$ is hydrogen and $R_2$ is lower alkoxy employing reducing agents such as sodium or potassium in solvents such as liquid ammonia.

In accordance with this invention, the compounds of this invention are produced by ring closing ethynylated lactams of the formula:

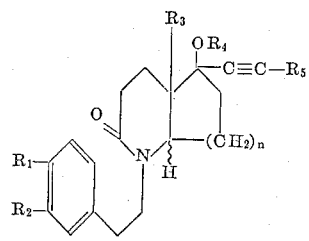

by reaction with an agent such as phosphorus oxychloride and the like.

The ethynylated lactams employed as starting material are described and claimed in our copending application, Serial No. 304,976 filed August 27, 1963, and Serial No. 248,872 filed January 3, 1962.

The starting materials for these ethynylated lactams are keto lactams of Formula V below. These are prepared from $R_1$ and $R_2$ substituted phenylalkylamines of the general Formula III below and substituted ketoacids of the general Formula IV below in accordance with the process described in our copending application Serial No. 318,190, filed October 23, 1963. The $R_1$ and $R_2$ substituted phenylalkylamines such as 3,4-diethoxyphenylethylamines are well known compounds which are described in the literature, for example in Chemical Abstracts, vol. 56, page 10006g, and by Ide et al. in J.A.C.S., vol. 59, page 726 (1937). The ketoacids of Formula IV are prepared according to the process described in our copending application Serial No. 310,146, filed September 19, 1963, using 2-$R_3$-cycloalkane-1,3-diones as starting material. Such 2-$R_3$-cycloalkane-1,3,-diones are well known in the art and may be prepared according to the procedure of Panouse and Sannie published in Bull Soc. Chim. France, 1955, page 1036. See also H. Smith, J.C.S. 1964, page 4472.

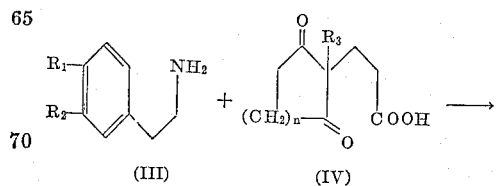

(III)   (IV)

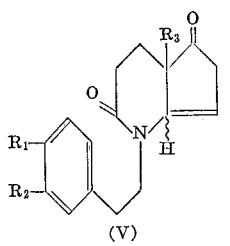

The keto lactam V is then treated with acetylene or $R_5$ substituted acetylene such as chloro- or methoxyacetylene to form the ethynylated lactams in accordance with the process set forth in U.S. Patent No. 3,219,668.

The ring closure reaction is generally carried out by refluxing the reactants in an inert solvent such as xylene, toluene or benzene for a period of 10 to 45 minutes to form a substituted quinolizine containing a quaternary nitrogen and having the formula:

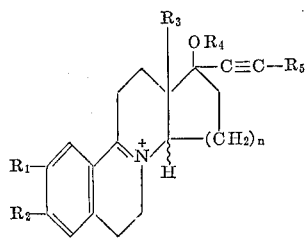

The above compound is then reduced to one having tertiary nitrogen by treatment with a complex alkali metal hydride in an inert solvent such as methanol, ethanol and the like. Suitable complex alkali metal hydrides for this reduction are, for example, potassium borohydride or sodium borohydride. The reaction product is recovered by removal of the solvent in vacuo.

The following examples are included in order further to illustrate the invention. All temperatures are given in degrees centigrade.

EXAMPLE 1

*Cis-1,2,3,3a,5,6,10b,11,12,12a-decahydro - 1 - hydroxy-1-ethynyl - 8 - methoxy - 12a - methylbenzo[a]cyclopenta[f]quinolizine hydrobromide*

A solution of 4.35 grams of cis-octahydro-1-(m-methoxyphenethyl) - 4a - methyl-5-hydroxy - 5 - ethynyl-2H-1-pyrindine-2-one in 100 ml. of benzene and 10 ml. of phosphorous oxychloride is refluxed for 20 minutes. The reaction mixture is concentrated to an oil under reduced pressure. The oil is dissolved in 300 ml. of ethanol and 5 grams of sodium borohydride added in portions over a period of one half hour. The mixture is stirred for one half hour more, diluted with 200 ml. of water and the total reaction mixture concentrated to dryness. The residue is partitioned between ether and water and the ether solution dried over magnesium sulfate. Dry hydrogen bromide is passed into the ether solution to give an oily precipitate. The oil is taken up in 10 ml. of methanol and cooled to 0° for about 16 hours to yield cis-1,2,3,3a,5,6,10b,11,12,12a - decahydro - 1 - hydroxy - 1-ethynyl-8-methoxy - 12a - methylbenzo[a]cyclopenta[f]-quinolizine hydrobromide as white crystals. The product is recrystallized from methanol to give a melting point of 237.9°.

EXAMPLE 2

*Trans-1,2,3,3a,5,6,10b,11,12,12a-decahydro - 1 - hydroxy 1-ethynyl-8-methoxy - 12a - methylbenzo[a]cyclopenta[f]quinolizine*

In the same way as described in Example 1, 15.5 grams of trans-octahydro-1-(m - methoxyphenethyl)-4a-methyl-5-hydroxy-5-ethynyl-2H-1-pyrindine-2-one gives, on cyclization with 50 ml.phosphorous oxychloride in 600 ml. of benzene followed by reduction with 15 grams of potassium borohydride, trans-1,2,3,3a,5,6,10b,11,12,12a - decahydro-1-hydroxy-1-ethynyl-8-methoxy-12a - methylbenzo[a]cyclopenta[f]quinolizine as white crystals having a melting point after recrystallization from ethanol-ether of 249°–251°.

EXAMPLE 3

*Cis-1,2,3,3a,5,6,10b,11,12,12a-decahydro - 1 - ethynyl-1,8-dihydroxy - 12a - methylbenzo[a]cyclopenta[f]quinolizine hydrobromide*

A solution of 1.8 grams of cis-octahydro-1-(m-methoxyphenethyl) - 4a - methyl-5-hydroxy - 5 - ethynyl-2H-1-pyrindine-2-one in 200 ml. of benzene containing 3 ml. of phosphorous oxychloride is refluxed for 20 minutes. The reaction mixture is concentrated to dryness under reduced pressure and the residue is dissolved in 150 ml. of ethanol. To this solution is added 5 grams of potassium borohydride and the mixture is stirred for 2 hours. The mixture is concentrated to dryness and the residue is dissolved in water and acidified with dilute hydrochloride acid. The solution is made basic with 10% ammonium hydroxide solution and the precipitate is extracted with methylene chloride. Dry hydrogen bromide is passed into the solution and the solution then concentrated to dryness. The residue is recrystallized from ethanol to give cis - 1,2,3,3a,5,6,10b,11,12,12a - decahydro - 1 - ethynyl - 1,8 - dihydroxy - 12a - methylbenzo[a]cyclopenta[f]quinolizine hydrobromide as white crystals, melting point 240.2°.

EXAMPLE 4

*Cis-2,3,3a,5,6,12,12a-octahydro - 1 - hydroxy-1-ethynyl-8-methoxy-12a-methyl - 1H - benzo[a]cyclopenta[f]quinolizinium perchlorate*

A solution of 0.25 g. of cis-octahydro-1-(m-methoxyphenethyl)-4a-methyl - 5 - hydroxy - 5 - ethynyl - 2H-1-pyrindine-2-one in 5 ml. of benzene is treated with 0.5 ml. of phosphorous oxychloride. The solution is refluxed for 20 minutes during which time a yellow oil precipitates. The mixture is concentrated to dryness and the residue is dissolved in 25 ml. of water. The clear solution is treated with a 10% solution of perchloric acid until precipitation of the oil salt is complete. The oil is taken up in 2 ml. of ethanol and cooled to give cis-2,3,3a,5,6,12,12a-octahydro-1-ethynyl-8-methoxy - 12a - methyl - 1H - benzo[a]cyclopenta[f]quinolizinium perchlorate as off-white crystals. After recrystallization from ethanol-ether, the product melts at 99°–101°.

EXAMPLE 5

*Trans-2,3,3a,5,6,12,12a - octahydro-1-hydroxy-1-ethynyl-8-methoxy - 12a - methyl - 1H - benzo[a]cyclopenta[f] quinolizinium perchlorate*

In the same way as described in Example 4, 0.5 g. of trans-octahydro-1- m-methoxyphenethyl) - 4a - methyl-5-hydroxy - 5 - ethynyl - 2H - 1 - pyrindine-2-one in 10 ml. of benzene and 1.0 ml. of phosphorous oxychloride gives trans-2,3,3a-5,6,12,12a-octahydro - 1 - hydroxy-1-ethynyl - 8 - methoxy - 12a - methyl - 1H - benzo[a]cyclopenta[f]quinolizinium perchlorate as yellow crystals, melting point 235.7° after recrystallization from isopropanol-acetonitrile.

EXAMPLE 6

*Cis-2,3,3a,5,6,12,12a - octahydro - 1 - ethynyl - 1,8 - dihydroxy-12a-methyl - 1H - benzo[a]cyclopenta[f]quinolizinium perchlorate*

In the same way as described in Example 4, 0.45 g. of cis-octahydro - 1 - (m - hydroxyphenethyl) - 4a - methyl-5-hydroxy-5-ethynyl - 2H - pyrindine-2-one in 20 ml. of benzene and 0.5 ml. of phosphorous oxychloride gives cis-2,3,3a,5,6,12,12a - octahydro - 1 - ethynyl - 1,8 - dihydroxy - 12a - methyl - 1H - benzo[a]cyclopenta[f]quinolizinium perchlorate as a pale yellow viscous oil.

It is understood that the foregoing detailed description is given merely by way of illustration and that many variations may be made therein without departing from the spirit of our invention.

Having described our invention, what we desire to secure by Letters Patent is:

1. A compound selected from the group consisting of those having the formula:

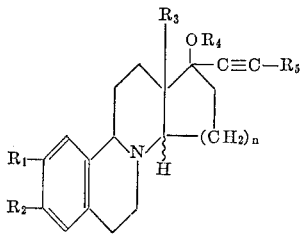

wherein $R_1$ and $R_2$ is each a member of the group consisting of hydrogen, hydroxy and lower alkoxy; $R_3$ is a member of the group consisting of hydrogen and lower alkyl; $R_4$ is a member selected from the group consisting of hydrogen and acyl of a carboxylic acid and $R_5$ is a member of the group consisting of hydrogen, halogen, lower alkoxy, aryl and lower alkyl and $n$ is an integer of from 1 to 2.

2. Cis - 1,2,3,3a,5,6,10b,11,12,12a -decahydro - 1 - hydroxy - 1 - ethynyl - 8 - methoxy - 12a - methylbenzo[a]cyclopenta[f]quinolizine hydrobromide.

3. Trans - 1,2,3,3a,5,6,10b,11,12,12a - decahydro-1-hydroxy - 1 - ethynyl-8-methoxy-12a-methylbenzo[a]cyclopenta[f]quinolizine.

4. Cis - 1,2,3,3a,5,6,10b,11,12,12a-decahydro-1-ethynyl-1,8-dihydroxy - 12a - methylbenzo[a]cyclopenta[f]quinolizine hydrobromide.

References Cited by the Examiner
UNITED STATES PATENTS

| | | | |
|---|---|---|---|
| 3,026,322 | 3/1962 | Schock | 260—286 |
| 3,027,378 | 3/1962 | Steck | 260—286 |
| 3,132,147 | 6/1964 | Schopf et al. | 260—289 X |
| 3,159,638 | 12/1964 | Ritchie | 260—289 X |

OTHER REFERENCES

Elderfield: Heterocyclic Compounds, volume 4, Wiley, 1952, page 390.

ALEX MAZEL, *Primary Examiner.*

HENRY R. JILES, NICHOLAS S. RIZZO, *Examiners.*

D. G. DAUS, *Assistant Examiner.*